(12) United States Patent
Henty

(10) Patent No.: US 11,392,214 B2
(45) Date of Patent: Jul. 19, 2022

(54) TOUCH CONTROL SYSTEM AND METHOD

(71) Applicant: David L. Henty, Newport Beach, CA (US)

(72) Inventor: David L. Henty, Newport Beach, CA (US)

( * ) Notice: Subject to any disclaimer, the term of this patent is extended or adjusted under 35 U.S.C. 154(b) by 0 days.

(21) Appl. No.: 16/666,231

(22) Filed: Oct. 28, 2019

(65) Prior Publication Data

US 2020/0201471 A1 Jun. 25, 2020

Related U.S. Application Data

(63) Continuation of application No. 14/966,840, filed on Dec. 11, 2015, now Pat. No. 10,459,564, which is a continuation-in-part of application No. 12/945,784, filed on Nov. 12, 2010, now Pat. No. 9,213,414.

(60) Provisional application No. 61/380,162, filed on Sep. 3, 2010, provisional application No. 61/261,244, filed on Nov. 13, 2009.

(51) Int. Cl.
*G06F 3/042* (2006.01)
*G06F 3/041* (2006.01)
*G06F 3/02* (2006.01)
*H04N 5/33* (2006.01)

(52) U.S. Cl.
CPC ............ *G06F 3/0202* (2013.01); *G06F 3/021* (2013.01); *G06F 3/0421* (2013.01); *G06F 3/0425* (2013.01); *G06F 3/04166* (2019.05); *H04N 5/33* (2013.01)

(58) Field of Classification Search
CPC ...... G06F 3/0202; G06F 3/021; G06F 3/0421; G06F 3/0425
See application file for complete search history.

(56) References Cited

U.S. PATENT DOCUMENTS

| | | | | |
|---|---|---|---|---|
| 8,130,210 | B2 * | 3/2012 | Saxena | G06F 3/0421 345/175 |
| 8,527,894 | B2 * | 9/2013 | Hughes | G06F 3/0236 715/773 |
| 9,029,780 | B2 * | 5/2015 | Alameh | G01S 17/50 250/341.7 |
| 2002/0190946 | A1 * | 12/2002 | Metzger | G06F 3/04842 345/156 |
| 2007/0091070 | A1 * | 4/2007 | C. Larsen | G06F 3/0213 345/168 |
| 2010/0123676 | A1 * | 5/2010 | Kirkup | G06F 1/169 345/174 |
| 2010/0148995 | A1 * | 6/2010 | Elias | G06F 3/0202 341/22 |
| 2010/0149099 | A1 * | 6/2010 | Elias | G06F 1/1616 345/168 |
| 2010/0225588 | A1 * | 9/2010 | Newton | G06F 3/0425 345/168 |
| 2010/0253634 | A1 * | 10/2010 | Lin | G06F 3/02 345/170 |
| 2010/0277413 | A1 * | 11/2010 | Wang | G06F 3/0202 345/168 |

(Continued)

*Primary Examiner* — Albert K Wong

(57) ABSTRACT

A system and method for providing a touch control system are disclosed. In one aspect a touch screen interface on a mechanical keyboard is disclosed. A touch sensing area on a keyboard having mechanical key mechanisms also provides a touch sensing surface. Touch position on the keyboard is detected and used to control a user interface. Unique touch sensing systems are also disclosed.

9 Claims, 10 Drawing Sheets

(56) References Cited

U.S. PATENT DOCUMENTS

| | | | |
|---|---|---|---|
| 2011/0210917 A1* | 9/2011 | LaFave | G06F 3/0489 345/160 |
| 2011/0241997 A1* | 10/2011 | Yang | G06F 3/03547 345/168 |
| 2012/0032887 A1* | 2/2012 | Chiu | G06F 1/1662 345/168 |
| 2012/0194511 A1* | 8/2012 | Cho | G06F 3/017 345/419 |
| 2012/0256839 A1* | 10/2012 | Suggs | G06F 3/0202 345/168 |
| 2013/0063285 A1* | 3/2013 | Elias | G06F 3/0446 341/33 |
| 2013/0063286 A1* | 3/2013 | Elias | H03K 17/9622 341/33 |
| 2013/0063356 A1* | 3/2013 | Martisauskas | G06F 3/0202 345/168 |
| 2013/0135211 A1* | 5/2013 | Chiang | G06F 3/0202 345/168 |
| 2014/0132516 A1* | 5/2014 | Tsai | G06F 3/0325 345/168 |
| 2014/0267029 A1* | 9/2014 | Govil | G06F 3/0304 345/157 |
| 2016/0154464 A1* | 6/2016 | Croisonnier | G06F 3/0304 345/168 |
| 2017/0170826 A1* | 6/2017 | Henty | G06F 1/1669 |
| 2017/0351341 A1* | 12/2017 | Norwalk | G06F 3/0202 |

* cited by examiner

TOUCH CONTROL SYSTEM AND METHOD

RELATED APPLICATION INFORMATION

The present application is a continuation of application Ser. No. 14/966,840 which is a continuation in part of application Ser. No. 12/945,784 which claims priority under 35 USC 119(e) to provisional application Ser. No. 61/261,244 filed Nov. 13, 2009 and provisional application Ser. No. 61/380,162 filed Sep. 3, 2010, the disclosures of which are incorporated herein by reference in their entirety.

BACKGROUND OF THE INVENTION

1. Field Of The Invention

The present invention relates to touch control systems and computer systems having touch control. The present invention further relates to systems and methods of control of computer systems including keyboard and touch control systems and methods.

2. Description of the Prior Art and Related Information

Touch control for mouse type computer control is common in laptop computers with touch pads and increasingly in computers with touch screen enabled monitors. Also, multi-touch control is becoming more common providing control not possible with simple mouse type control in touch screen systems. However, using a touch screen display over time can fatigue the users arm if the monitor is vertical. Various twisting and other movable displays have been developed to allow flat display and vertical display operation especially in portable computers to provide tablet type use in a horizontal position and conventional vertical display use. Conventional touch pads are typically too small for multi-touch use when in a standard laptop format. Accordingly, touch control systems have been limited by poor ergonomics, mechanical complexity or lack of space for multi-touch control.

SUMMARY OF THE INVENTION

In one aspect the present invention provides a system and method for providing a touch interface on a keyboard having a plurality of mechanically movable keys and tactile key entry.

In another aspect the present invention provides touch sensing systems compatible with the above noted system and method or other touch sensing applications.

Further aspects of the invention are disclosed in the following detailed description.

DETAILED DESCRIPTION OF THE INVENTION

The present application hereby incorporates by reference the disclosures of U.S. Pat. No. 6,094,156 and U.S. patent application Ser. No. 12/075,694, filed Mar. 13, 2008.

Figure 1:
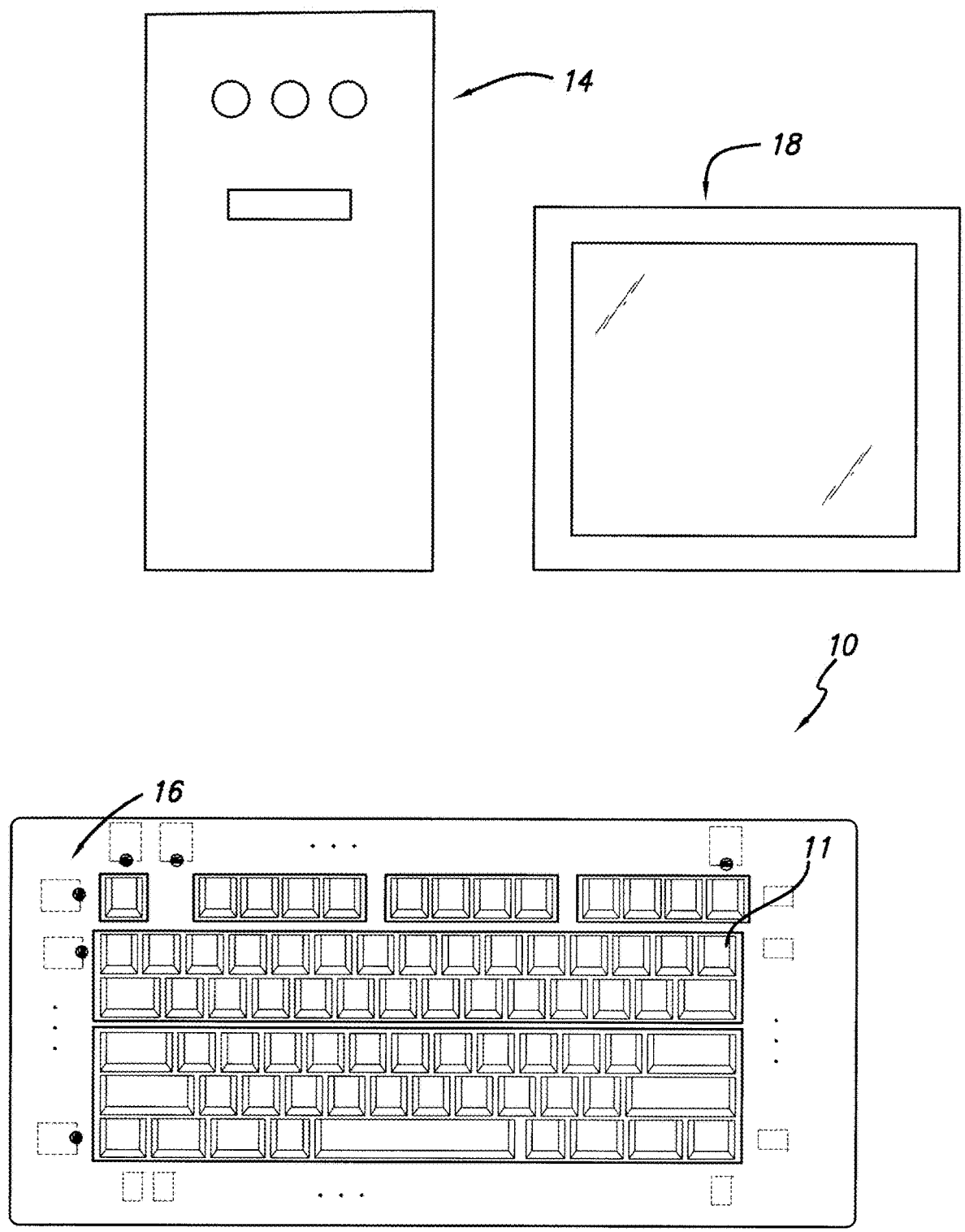
FIG. 1 is a drawing of a computer system with a wired or wireless keyboard having integrated touch control in accordance with the present invention.

Referring to FIG. 1, a computer system incorporating a wired or wireless keyboard 10 with integrated touch control is illustrated. Keyboard 10 may be a QWERTY keyboard of an integral one piece conventional construction or may incorporate a folding design such as disclosed in the above noted '156 patent and '694 application. The computer system as illustrated also includes a housing 14 which includes the processor, hard disk drive, and other components in a conventional computer system, as well as a receiver to receive wireless key and touch control transmission from keyboard 10 in a wireless keyboard embodiment. The computer system also includes a monitor 18 which may be a CRT or LCD type of display or other display known in the computer art. The computer system may also comprise a laptop system with keyboard 10 integrated with a display and motherboard in an embodiment which is equally implied herein.

The system employing the keyboard may also comprise an entertainment system as described in the above noted '156 patent, incorporated herein by reference. Such an entertainment system may include a game system and some or all of the keys game control keys and provide touch control game operation as well, employing a touch control input as described below. Also, a variety of computing devices such as so called internet appliances and other desktop and portable systems may employ the invention.

The keyboard includes plural separate keys 11, for example in a conventional QWERTY layout, and a touch control area overlapping the keys as defined by touch position sensing elements 16. In a preferred embodiment these elements 16 comprise an array of IR LEDs and opposed IR sensors arranged around the perimeter of the keys. Such touch sensing systems are known for touch screen applications and are available commercially from a number of suppliers. Accordingly, details of their operation will be omitted. Keys 11 are recessed slightly to allow the IR beams to pass over the top of the keys to allow detection of finger position during touch control operation as one or more fingers are brushed over the surface of the keys. When not in touch control mode the keys 11 function as a conventional keyboard providing text input as well as other standard keyboard key inputs. In an alternate embodiment sensing elements 16 may comprise one or more cameras and an IR source with keys 11 made of an IR transmissive but visible light opaque material. The cameras are configured to image the keys from below and will detect finger position by scattered IR light transmitted through the keys. Camera based position detection systems using IR are also known from touch screen applications. Suitable low cost IR transmissive and optically opaque materials are also well known, for example as used in IR windows in remote controls, which may be used for the keys 11 in such an embodiment. Alternatively, a deformable touch sensitive membrane may be provided over the mechanical portion of the keys and provide touch position detection. Such deformable touch sensors are known in the art.

Figure 2:
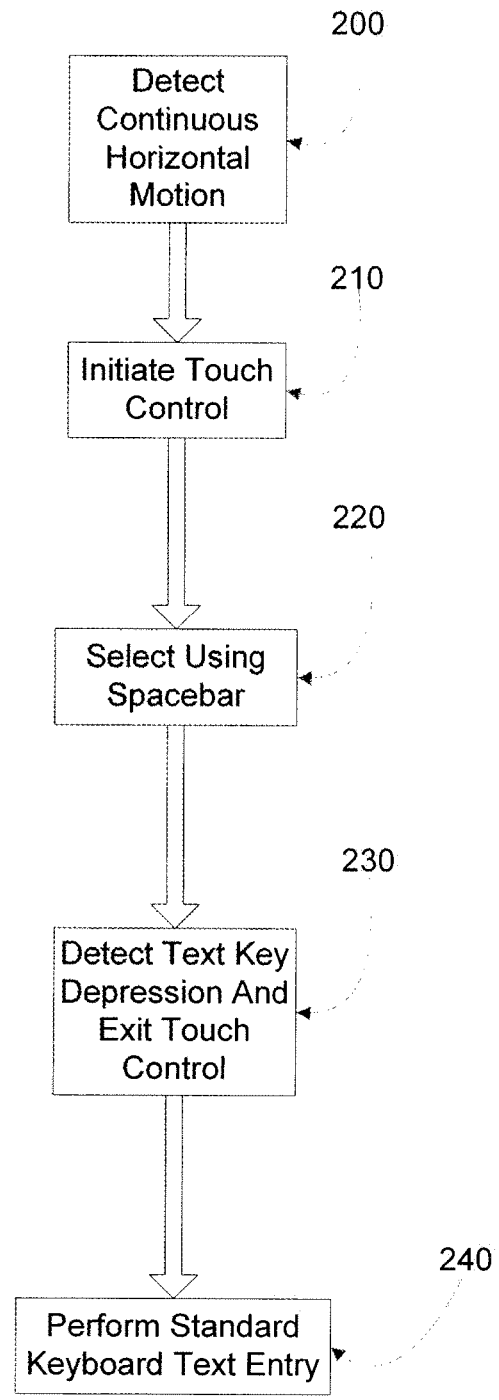
FIG. 2 is a flow diagram illustrating entry and exit of touch control mode of operation of the system of FIG. 1.

FIG. 2 is a flow diagram illustrating entry and exit of touch control mode of operation of the system of FIG. 1. Preferably automatic entry and exit of touch control operation is provided along with dual functionality of one or more keys on the keyboard, for example the spacebar and/or enter key. At 200 a motion indicating desired touch control is detected. This is a motion distinct from normal keyboard use and may preferably comprise a continuous horizontal motion over plural keys. The motion may also require a unique aspect such as a circular motion or other distinctive motion of a finger or two fingers over the keys. When this motion is detected touch control is initiated at 210. Alternatively a specific key not used for text entry may be allocated to entry of touch control mode.

When touch control mode is entered one or more keys 11 are preferably reassigned. For example the spacebar may be reassigned as a mouse left select key and the enter key reassigned as a right select key. Alternatively all keys within the touch area may be reassigned as a select function so a user can move around the screen interface using touch sensing and select without moving the hand. Use of such one or more reassigned keys is illustrated at 220 in the flow diagram. The reassigned key(s) are preferably located outside of the virtual sensing area (see discussion of FIG. 9 below). The specific key(s) reassigned may be user selectable. When in touch control mode multi-touch control may also be initiated with two finger motion providing various control over the display such as zoom out and in, drag, rotate, etc as well known and supported in various operating systems and applications. At 230 the touch control mode is exited by detecting operation of any text key 11 or a specific key assigned to exit the touch mode, such as alt, ctrl or an f function key. Standard keyboard use then resumes at 240 and the spacebar and/or enter key or other reassigned key is returned to normal functionality. In this way rapid entry and exit of touch mode may be provided and easy selection with no added space for a touch pad or special mouse select buttons. (Alternatively, however, separate left and right click buttons such as in a conventional trackpad may be provided, for example at the bottom of the keyboard.) Also, due to the full use of the keyboard area multi-touch control may be easily provided.

Figure 3:
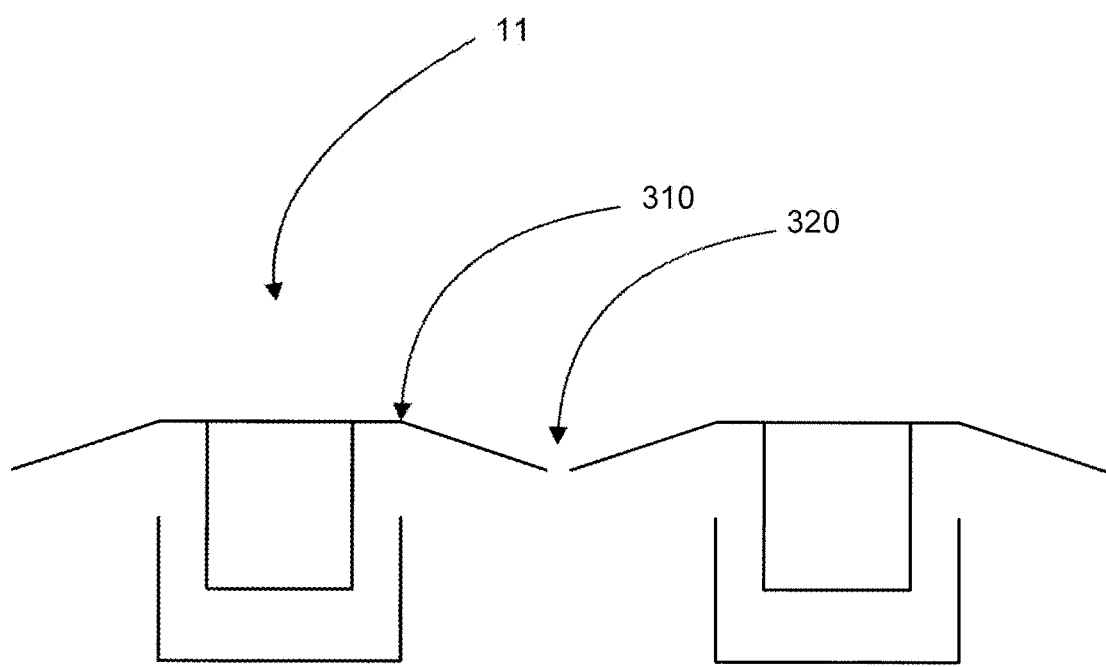
FIG. 3 is a cutaway view of the keyboard of FIG. 1 illustrating the smooth surface of the keyboard adapted for touch control.

FIG. 3 is a cutaway view of a portion of the keyboard of FIG. 1 illustrating the smooth surface of the keyboard adapted for touch control. The text keys forming the majority of the touch surface area may be conventional in pitch and activation, in the illustrated implementation being a keycap and slide tube configured over a membrane bubble key switch (not shown) as in conventional desktop keyboards. Alternatively, a scissor switch or other conventional key support and activation implementation may be employed. The key cap design differs from conventional keys in that a smooth transition 310 is provided between the top of the key cap and bezel which transition preferably has a radius for a smooth feel rather than an abrupt edge. Also a flat top surface is provided as opposed to a cupped surface as in conventional keycaps which have a shape to correspond to a curved finger tip. Also a shallow bezel recess from the surface is provided (difference in height between point 310 and key split point 320). For example about a 1-2 mm recess (or less) is provided. This provides a smoother surface feel for touch operation. A key travel of about 2 mm may also be provided. If the recess is reduced to zero a flat overall surface is provided retaining inter key gap 320. For standard 19 mm pitch (center to center spacing) the key cap surface would then be about 19 mm (depending on tolerance for inter key gap 320). Alternatively, in this case of no bezel, a slight increase in key pitch may be provided to avoid adjacent key touching for some users, for example an increase from standard 19 mm center to center key pitch may be provided up to about 23 mm. Key travel of at least about 2 mm is preferably retained even for zero recess, however.

Figure 4:
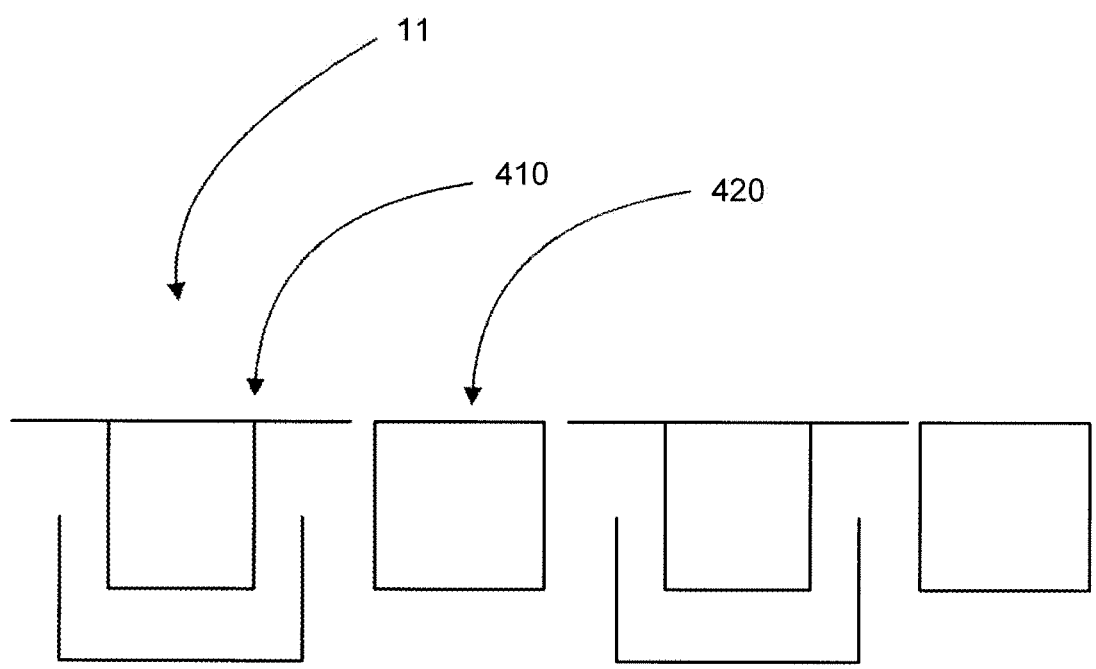
FIG. 4 is a cutaway view of the keyboard of FIG. 1 illustrating the smooth surface of the keyboard adapted for touch control in an alternate embodiment.

FIG. 4 is a cutaway view of the keyboard of FIG. 1 illustrating the smooth surface of the keyboard adapted for touch control in an alternate embodiment. In this embodiment a flat surface is provided while avoiding inter key interference even for a standard key pitch (19 mm) by providing a smooth slightly deformable insert 420 between the keys. For example, key cap surface 410 may be about 15 mm wide and insert about 4 mm wide providing a total center to center key pitch of 19 mm. Alternatively, key cap surface 410 may be about 17-18 mm wide and insert about 1-2 mm wide providing a total center to center key pitch of 19 mm. Also, as in the prior embodiment a slightly greater key pitch than standard may be provided, for example, a top surface 410 of about 19 mm, an insert of about 2 mm and a total key pitch of 21 mm. As in the prior embodiments a shallow key travel of about 2 mm is preferably employed. The insert 420 shown may be part of a single membrane or deformable layer insert adapted to conform to a bezel free key layout. Such a deformable layer may be a touch sensitive membrane and provide touch position detection by interpolation or may be provided over the mechanical portion of the keys. Such deformable touch sensors are known in the art. Depending on the specific touch sensitive membrane and depth of the key travel, in the latter case the membrane may not deform smoothly at key corners. In this case the touch sensitive membrane may be provided in strips, for example individual strips extending along key rows (or possibly columns or other key groupings). Also folds may be provided in the inter-key spaces to allow greater bending distance of the membrane. In either case the touch sensitive strips or portions may provide continuous touch position detection by interpolation. The use of interpolation in a discontinuous touch sensing surface and implementation details are described in more detail in U.S. pending patent application Ser. No. 14/518,969, filed Oct. 20, 2014, the disclosure of which is incorporated herein by reference in its entirety. In the case of such touch sensing strips or sections these may be attached to another more flexible membrane to provide a continuous touch surface if desired.

Figure 5:
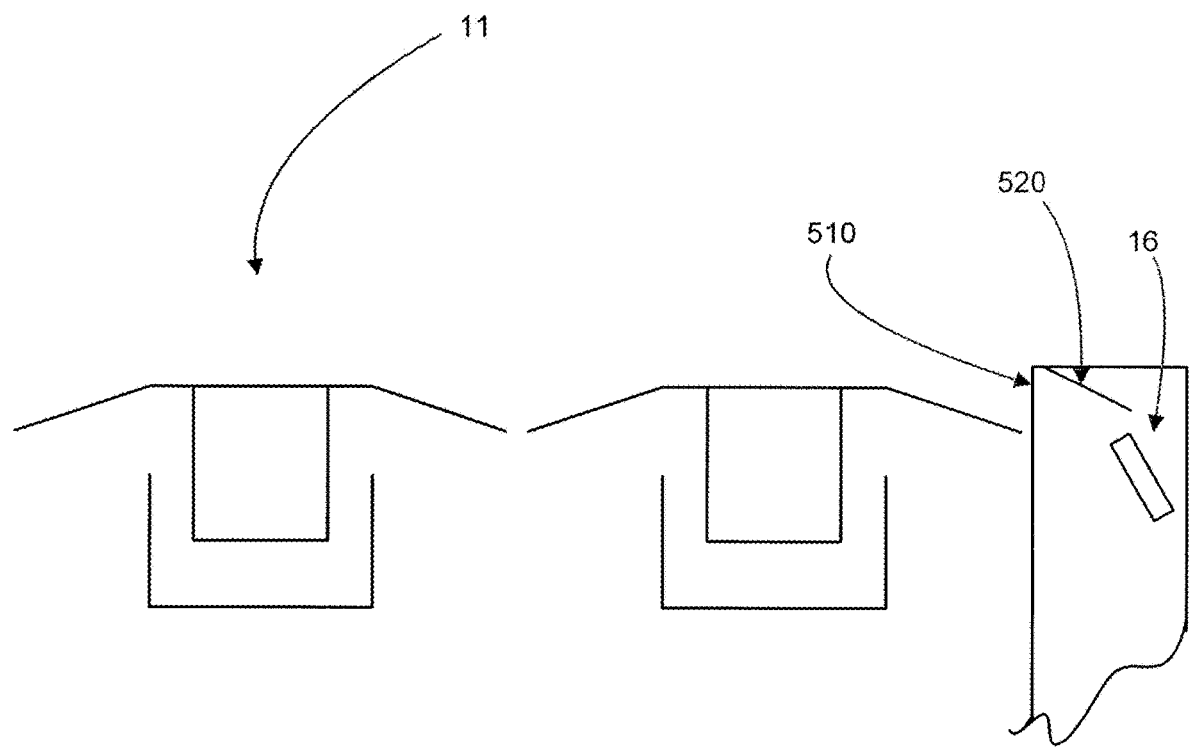
FIG. 5 is a cutaway view of the keyboard of FIG. 1 illustrating an angled IR LED and an angled reflector providing a low profile keyboard edge for providing the touch sensing beam.
Figure 6:
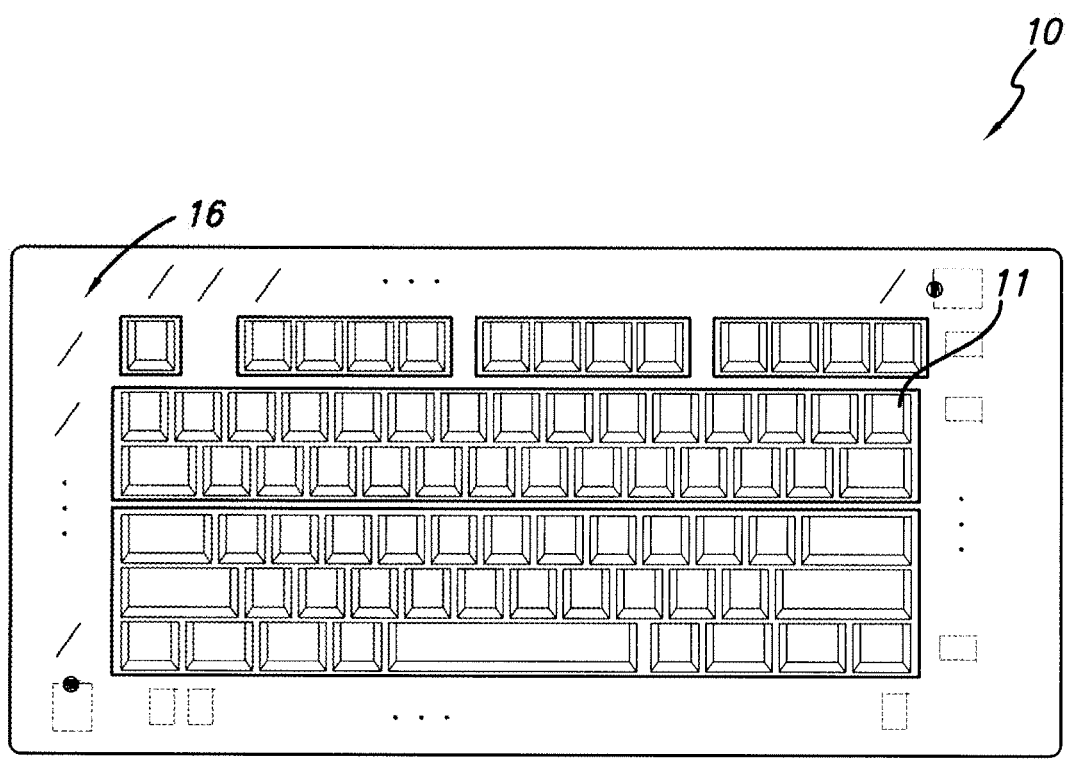
FIG. 6 is a top partial cutaway view of the keyboard of FIG. 1 illustrating an embodiment employing two IR LEDs and plural angled reflectors for providing the touch sensing beam.

FIG. 5 is a cutaway view of an edge portion of the keyboard of FIG. 1 illustrating an angled IR LED 16 and an angled IR reflector 520 providing a low profile keyboard edge 510 for providing the touch sensing beam. For example, an edge 510 of about 2-4 mm above the key surface may be provided even for LEDs of greater diameter. Also, more space is available for LED driver circuitry. A similar reflector may be used for the IR receiver with a suitable angled receiver. Therefore, an annular reflective strip around the keyboard may be provided. Alternatively, plural angled reflectors may be provided oriented at an angle to horizontal and vertical so two side pointing LEDs may be reflected to plural receivers along each of the two edges. This may employ a partial reflector at each position or an LCD switched reflector at each location. This embodiment is illustrated in FIG. 6. This may provide further space savings and potentially cost savings.

Figure 7:
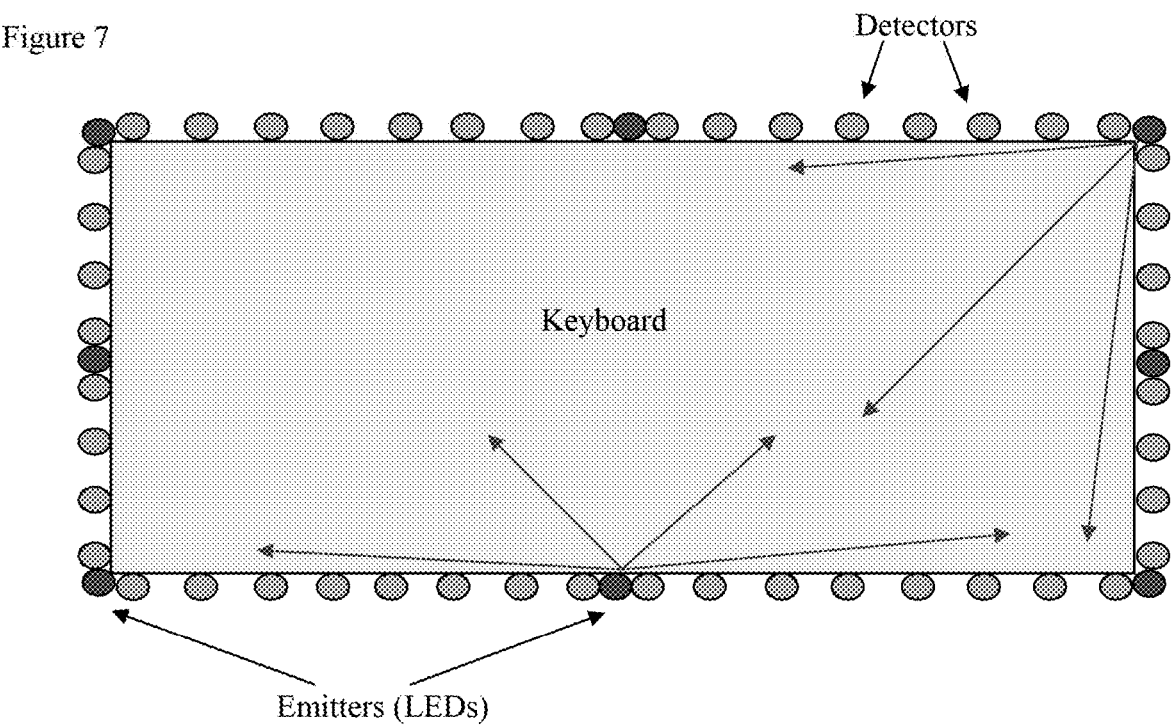
FIG. 7 and FIG. 8 are schematic drawings of the keyboard illustrating an alternate embodiment of the LED touch position detection system.
Figure 8:
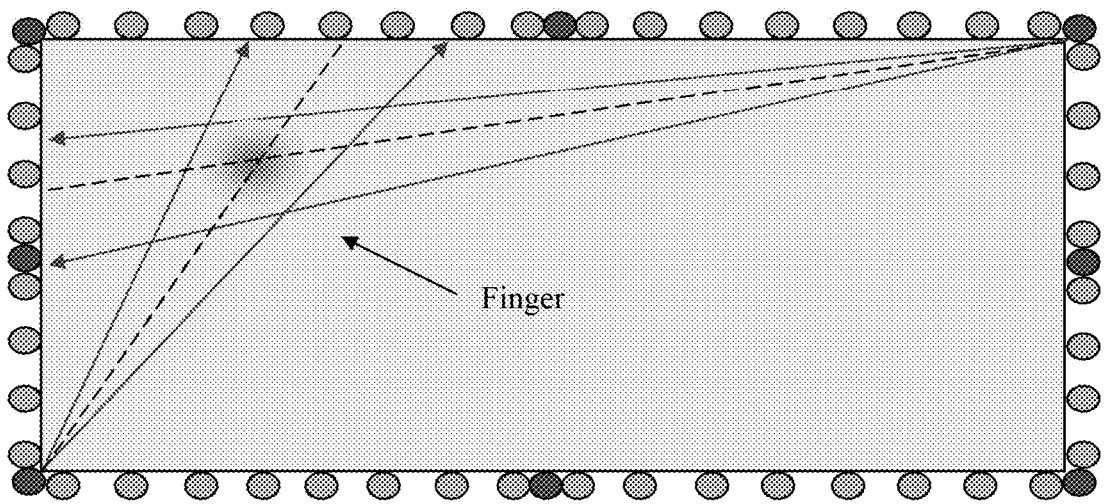

Referring to FIG. 7 and FIG. 8 an alternate embodiment of the LED touch position detection is illustrated. The embodiment uses infrared LEDs and detectors as in the prior embodiments but uses fewer, wider angle LED emitters, and fewer receivers. The desired resolution is nonetheless achieved by using pulsed LEDs and the timing information to derive direction information. Infrared emitters (LEDs) are located at multiple (2+) locations around the keyboard with 8 shown in the illustrated embodiment located at the four corners and center of each side. The corner emitters will have approximately 90 degree beam angle or greater while the side emitters have a wider beam angle preferably about 180 degrees or greater. Detectors are also located at multiple locations around the keyboard perimeter (24 being illustrated). Emitters are pulsed one at a time in sequence. The response at each detector is stored for each pulse. The time of the detector signal thus corresponds to a specific LED and hence direction. By rotating the LED activation around the keyboard in sequence and storing detected signals a series of directions vs signal strength may be derived as shown in FIG. 8. Where a finger blocks the path of an emitter, the response seen at one or more detectors is lower. Once all emitters have been pulsed, a processor analyzes the data and calculates the position of the finger(s), and moves an on-screen cursor accordingly.

As one specific example, the frequency of each cycle shall be 100 Hz. Each cycle shall comprise data from each emitter (LED) activated in turn. Therefore, for e.g., 8 LEDs the LEDs would be pulsed to provide individual detector timing windows at 800 Hz. The individual LED pulse duration is preferably much shorter than a detection window however to provide clear discrimination between LEDs in the time domain. The LEDs may be identified starting with the number 1 for the top left LED, incrementing in a clockwise direction. LEDs shall be activated in order starting with number 1. The data for each LED shall include data from each detector. The detectors similarly may be identified starting with the number 1 for the top left sensor, incrementing in a clockwise direction. Sensor data shall be reported in order starting with number 1. The detector data shall be an 8 bit level of intensity. Noise should be <1 bit.

Assuming the detector response can be converted to suitable levels, e.g. 256 intensities, weighted interpolation may be employed to achieve cursor resolution several times that of the number of detectors. That is, as shown in FIG. 8, the variation in signal due to the finger shadow is greater for the center detector (shown between the two lines corresponding to boundaries of the finger shadow) than the two detectors on either side. This variation is weighted between the detectors to derive a position to greater accuracy than the simple number of detector locations. For example, a normalized center of gravity calculation may be employed to provide the weighted interpolation. Assuming e.g. 256 intensities, weighted interpolation may be employed to achieve cursor resolution about 10 times that of the number of detectors. This in turn allows a reduction in number of detectors for a desired accuracy with attendant cost and space savings.

Although finger detection is shown based on finger shadow detection, in an alternate implementation reflected IR may be detected to derive finger position. The position location processing will be more complex and must be modified accordingly.

The above processing to derive finger position may be implemented in the laptop microprocessor if the keyboard is configured in a laptop, or in the PC processor if implemented as a separate keyboard, to reduce cost and the output of the detectors may be provided via a USB protocol or may emulate a standard serial device and work with e.g., standard Windows serial driver, appearing as a COM port. Alternatively, finger position processing may be done in a dedicated processor chip.

Figure 9:
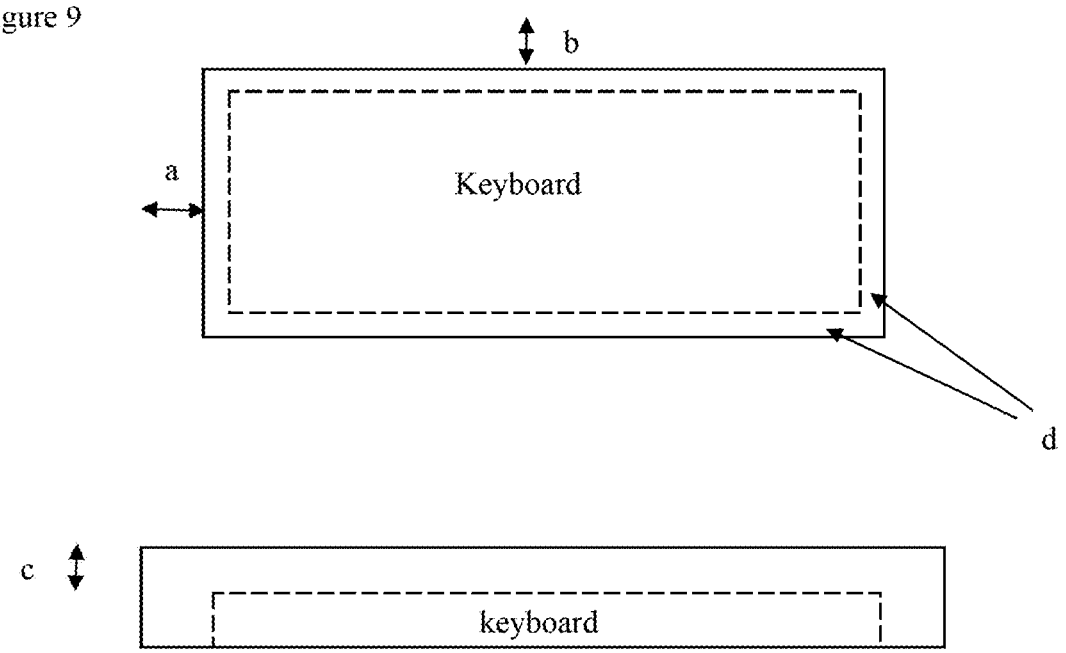
FIG. 9 is a schematic drawing of the sensing area relative to the keyboard.

The present invention may be used to implement direct position control of the computer GUI interface such as in a touchscreen computer or may provide motion control such as in a conventional mouse control. In the former case the touch sensing area preferably has the same aspect ratio as the computer screen to mirror the screen on the keyboard. This sensing area will therefore typically not match the keyboard which will have a different aspect ratio and size and a boundary area of the keyboard outside the sensing area with keys will be provided. The PC processor communication protocol may include command(s) to allow the active sensing area to be defined by the user or for different screens by an OEM integrator. The active area will be defined as top, left, width, height, in percentage units, where the full height of the keyboard is considered 100% in the vertical direction, the full width of the keyboard is considered 100% in the horizontal direction. This requirement is to allow the aspect ratio of the sensing area to be matched to the screen aspect ratio, and to allow keys outside the sensing area to be used for clicking etc. Each of these may vary e.g., from 50 to 100%. The sensing area relative to the keyboard is schematically illustrated in FIG. 9. Size: Height, width of sensing area will vary according to size of keyboard and aspect ratio of the computer screen. A typical size will be 15.0"×4.5". Thickness of the sensing mechanism (FIG. 9 distances a and b) will preferably not exceed 7.0 mm. Gap between keyboard and sensing mechanism (FIG. 9 distance d) will preferably not exceed 3.0 mm. Height above key caps (FIG. 9 distance c) will preferably not exceed 5.0 mm.

In a further aspect the control mode may be selected by a user to switch between direct position control and motion or relative mouse type control. The communication protocol with the PC processor therefore preferably includes command(s) to switch between absolute and relative coordinates. In relative coordinates mode, the keyboard behaves like a mouse, with finger movement moving the cursor relative to its current position. In absolute coordinates mode, the keyboard behaves like a touchscreen or drawing tablet, with absolute finger position within the sensing area corresponding to a fixed cursor position on screen. The keyboard may also incorporate a conventional track pad which is used for conventional mouse control.

Figure 10:
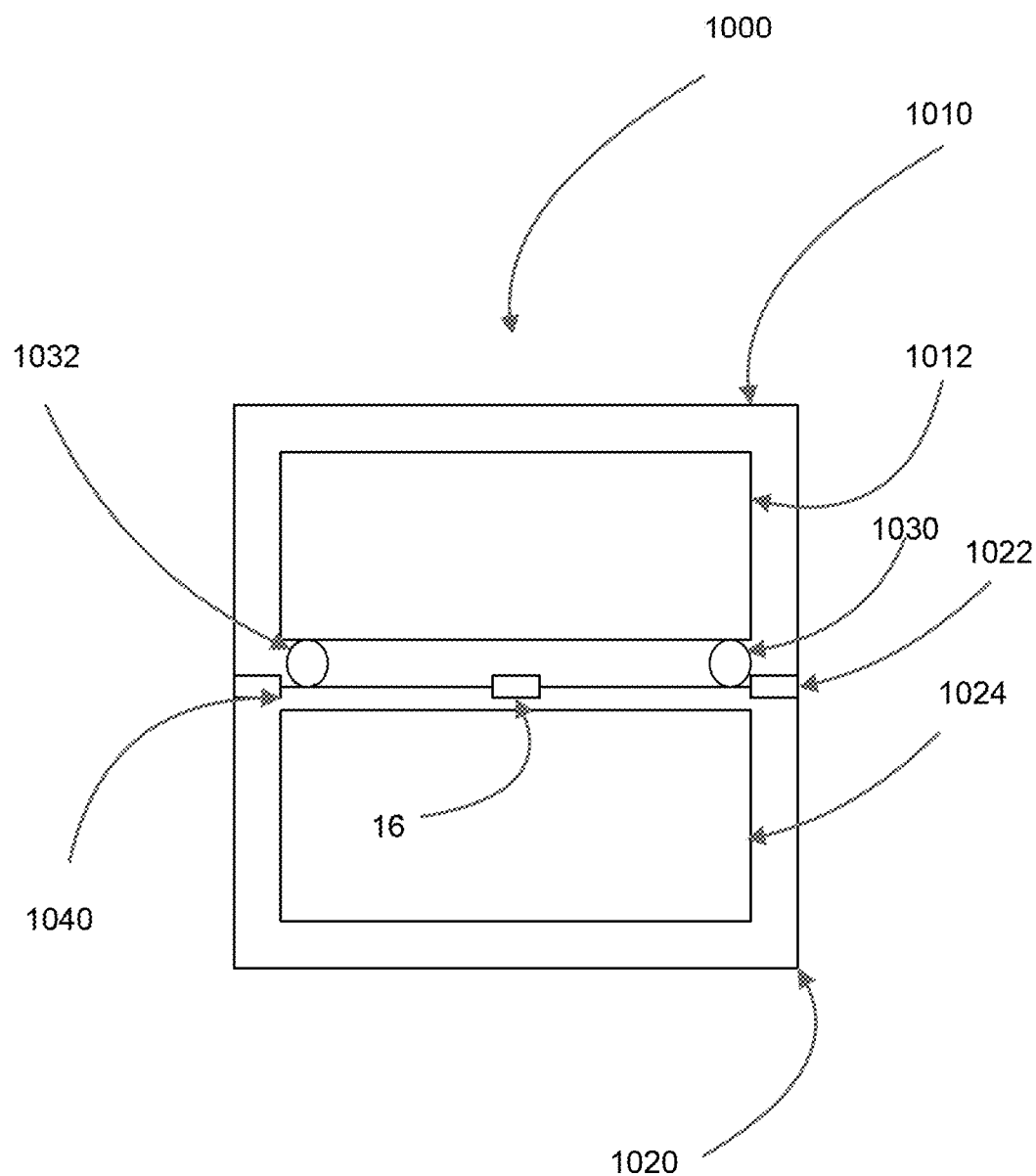
FIG. 10 is a schematic drawing of a portable computer employing touch sensing in accordance with the invention.

Referring to FIG. 10 a portable computer is illustrated, such as a laptop or notebook computer, employing the present invention. The computer includes a display screen section 1010 with screen 1012 coupled to keyboard section 1020 via hinges 1022. The illustration in FIG. 10 is meant to illustrate these sections as approximately perpendicular. Keyboard section 1020 includes a keyboard 1024 with mechanically activated keys configured with substantially flat key caps and very small interkey gap for easy sliding of fingers thereover as described above. A touch sensing system is provided with a touch sensing area within keyboard 1024 which mirrors screen 1012 as described above, e.g., in relation to FIG. 9. This sensing system may be configured in the perimeter portion of keyboard section 1020 as in the embodiments described above. Alternatively some or all of the sensing system may be configured in the screen section 1010. In particular, in one embodiment cameras 1030, 1032 are provided in the bottom of screen section 1010 and image the surface of the keyboard to detect touch location by detecting finger location in a narrow vertical field of view above the keys and triangulating touch position. Such systems are known and the techniques for touch location are known and accordingly need not be described in detail herein. For example U.S. Pat. No. 7,692,625 the disclosure of which is incorporated herein by reference in its entirety. However, in the present implementation in the portable computer screen section as shown the cameras' 1030, 1032 pointing direction and field of view will change as the screen angle is adjusted. For example, users may often adjust screen angle by as much as +/−30 degrees due to varying conditions of use, i.e., between about 60 degrees and 120 degrees relative to horizontal (or keyboard plane). The present invention provides an adjustment system which detects the screen angle and adjusts the camera field of view to allow camera based touch location. In one embodiment each of cameras 1030, 1032 will be mounted in screen section 1010 at a location substantially flush with keyboard section 1020 surface and pointing directly toward the keyboard section when the screen is vertical. The cameras may employ reflected IR detection in which case one or more IR emitters are mounted to the screen section or hinges and the cameras would employ IR filters. Cameras 1030, 1032 each incorporate a lens providing a vertical field of view of at least about 60 degrees, or more generally about 60-90 degrees, to accommodate the possible change in screen position. An angle sensor 1040 is configured in a hinge 1022 or in the screen section immediately adjacent a hinge and detects screen angle deviation from a nominal operational position, normally 90 degrees to the keyboard surface. This angle offset is provided to the camera image processor which adjusts the region of interest of the camera image to the portion corresponding to the keyboard surface, i.e., moving the image region of interest vertically up or down with angle offset plus or minus from nominal. Camera based touch sensing systems conventionally employ a dedicated processor for image processing in which case the angle offset is provided to this processor. However, in a preferred embodiment the present invention provides a deviation from this dedicated processor approach and employs the computer processor to perform the image processing and triangulation algorithm for touch location determination. In this case the angle offset information is provided to the computer processor for use by the image processing algorithm. Alternatively, or in combination with the angle sensor, a distinctive fiducial mark may be detected on the keyboard section preferably adjacent the screen section. In combination, the detection of an angle change by the sensor may initiate a recalibration algorithm within the image processing algorithm to locate the marker and adjust the region of interest corresponding to the keyboard. Alternatively this may comprise a fine adjustment after a coarse adjustment using the angle sensor. In an embodiment with IR detection the fiducial mark may be replaced with an IR emitter which is turned on for a brief time, for example under a second, for calibration when the screen angle is changed. In another embodiment the cameras 1030, 1032 may be configured in hinges 1022 in which case they would remain fixed relative to the keyboard while not interfering with keyboard look or layout.

In another embodiment some portion of the LED emitter detector touch sensing system 16 described above may be mounted in hinges 1022 or in a portion of the screen section. In particular the embodiment described in relation to FIGS. 7 and 8 may use a reduced number of emitters and detectors enabling use of hinges 1022 to provide the top portion of the system 16 reducing impact on keyboard surface features for implementing the touch sensing system. The portion of system 16 may also be mounted in the screen section in which case means may be provided to compensate for screen angle, including mechanical means for changing tilt of the emitters or detectors or means for adjusting an aperture or lens effective direction.

Further modifications may be made which will be appreciated from the above teachings and the illustrated embodiments should not be viewed as limiting in nature.

What is claimed is:

1. A position sensing system, comprising:
a plurality of IR LEDs positioned about a position sensing region;
at least one IR detector positioned about the position sensing region, wherein at least one of the IR detectors is illuminated by plural IR LEDs when active; and
a control system which sequentially pulses the IR LEDs, wherein at least one of the IR detectors are sequentially illuminated by the plural LEDs, wherein the control system determines a detector signal strength at said detector for a timing window for each IR LED pulse, correlates the time of the detector window signal to a specific LED, and wherein the control system processes the detected signal strength from at least one detector to determine the location of an object in the position sensing region.

2. The position sensing system in claim 1, wherein the location of the object controls a GUI.

3. The position sensing system as set out in claim 2, wherein the control system weights detected signal strengths from plural detectors to derive the location of an object in the position sensing region based on blocking of the LED signals by the object.

4. The position sensing system as set out in claim 2, wherein the control system weights detected signal strengths from plural detectors to derive the location of an object in the position sensing region based on reflection of the LED signals by the object.

5. The position sensing system as set out in claim 1, wherein the position sensing region is a substantially planar region and the IR LEDs and detectors are configured about the perimeter of the planar region.

6. The position sensing system as set out in claim 1, wherein the control system comprises a computer processor.

7. A position sensing method employing a computer system including:
a display having a position sensing region;
a plurality of IR LEDs positioned within the position sensing region;
at least one IR detector positioned within the position sensing region; and
a position sensing system including a processor, the method comprising:
displaying a graphical user interface on the display screen;
using the position sensing system to sequentially illuminate the plurality of IR LEDs;
detecting the sequential illumination of the plurality of IR LEDs by at least one IR detector;
determining a signal strength at at least one IR detector;

correlating the signal strength with a timing window corresponding to the sequential illumination of the plurality of IR LEDs; and determining a position of an object in the position sensing region based on the signal strength and timing window.

8. The position sensing method of claim 7, further comprising using the determined position to display an object on the graphical user interface corresponding to the determined position.

9. The position sensing method of claim 7, wherein the computer system includes a plurality of IR detectors and the step of determining the position of the object in the sensing region is based on the signal strength and timing window of each of the plurality of IR detectors.

* * * * *